(12) United States Patent
Ha et al.

(10) Patent No.: US 11,391,954 B2
(45) Date of Patent: Jul. 19, 2022

(54) OPTICAL DEVICE FOR AUGMENTED REALITY

(71) Applicant: LETINAR CO., LTD, Anyang-si (KR)

(72) Inventors: Jeong Hun Ha, Seoul (KR); Soon Gi Park, Seoul (KR)

(73) Assignee: LETINAR CO., LTD., Anyang-si (KR)

( * ) Notice: Subject to any disclaimer, the term of this patent is extended or adjusted under 35 U.S.C. 154(b) by 0 days.

(21) Appl. No.: 17/291,802

(22) PCT Filed: Sep. 2, 2019

(86) PCT No.: PCT/KR2019/011244
§ 371 (c)(1),
(2) Date: May 6, 2021

(87) PCT Pub. No.: WO2020/096187
PCT Pub. Date: May 14, 2020

(65) Prior Publication Data
US 2021/0389589 A1   Dec. 16, 2021

(30) Foreign Application Priority Data
Nov. 8, 2018   (KR) .................... 10-2018-0136910

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G02B 27/0983* (2013.01); *G06T 19/006* (2013.01)

(58) Field of Classification Search
CPC ............ G02B 27/0075; G02B 27/0101; G02B 27/0172; G02B 27/0176; G02B 27/0179;
(Continued)

(56) References Cited

U.S. PATENT DOCUMENTS 8,767,306 B1    7/2014  Miao et al.
11,073,695 B2 * 7/2021  Gao ..................... H04N 13/332
(Continued)

FOREIGN PATENT DOCUMENTS

JP     2011-059444 A    3/2011
KR     10-1660519 B1    9/2016
(Continued)

*Primary Examiner* — Nelson M Rosario
(74) *Attorney, Agent, or Firm* — Rabin & Berdo, P.C.

(57) ABSTRACT

The present invention provides an optical device for augmented reality, the optical device including: an optical means for transmitting at least part of visible light therethrough; and a reflective unit disposed on the surface of or in the inside of the optical means, and configured to reflect image light corresponding to an image for augmented reality, output from an image output unit, toward the pupil of an eye of a user; wherein the reflective unit is formed in an asymmetric shape representing a shape other than a point-symmetric shape; and wherein the point-symmetric shape is a shape in which there is a specific point that allows the shape to be always the same for all rotation angles when the reflective unit is rotated around a specific point on the plane of the reflective unit, and the asymmetric shape is a shape that is not the point-symmetric shape.

11 Claims, 8 Drawing Sheets

(51) Int. Cl.
*G02B 27/09* (2006.01)
*G06T 19/00* (2011.01)

(58) Field of Classification Search
CPC .......... G02B 17/006; G02B 2027/0127; G02B 2027/0138; G02B 2027/0178; G02B 2027/0185; G02B 27/0093; G02B 27/01; G02B 27/0983; G02B 30/00; G06T 19/006
See application file for complete search history.

(56) References Cited

U.S. PATENT DOCUMENTS

2012/0268481 A1* 10/2012 Niioka .................. G02B 30/27
345/619
2018/0149869 A1* 5/2018 Bergquist ............... G02C 7/165

FOREIGN PATENT DOCUMENTS

| KR | 10-2018-0027813 A | 3/2018 |
| KR | 10-2018-0028339 A | 3/2018 |
| KR | 10-2018-0055122 A | 5/2018 |
| KR | 10-2018-0081211 A | 7/2018 |

\* cited by examiner

OPTICAL DEVICE FOR AUGMENTED REALITY

TECHNICAL FIELD

The present invention relates to an optical device for augmented reality, and more particularly to an optical device for augmented reality that is capable of providing an augmented reality image to a user by using one or more reflective units having various shapes and the arrangement structure thereof.

BACKGROUND ART

Augmented Reality (AR) refers to technology that superimposes a virtual image, generated by a computer or the like, on a real image of the real world and then provides a resulting image, as is well known.

In order to implement augmented reality, there is required an optical system that allows a virtual image, generated by a device such as a computer, to be superimposed on an image of the real world and then allows a resulting image to be provided. As such an optical system, there is known a technology using an optical means such as a prism for reflecting or refracting a virtual image by using a head-mounted display (HMD) or a glasses-type device.

However, devices using the conventional optical system have problems in that it is inconvenient for a user to wear them because the configurations thereof are complicated and thus the weights and volumes thereof are considerable and in that the manufacturing costs thereof are high because the manufacturing processes thereof are also complicated.

Furthermore, the conventional devices have a limitation in that a virtual image becomes out of focus when a user changes focal length when gazing at the real world. To overcome this problem, there have been proposed technologies by using a configuration such as a prism capable of adjusting focal length for a virtual image or by electrically controlling a variable focal lens in response to a change in focal length. However, these technologies also have a problem in that a user needs to perform a separate operation in order to adjust focal length or in that hardware such as a separate processor and software for controlling focal length are required.

In order to overcome the problems of the conventional technologies, the present applicant has developed an apparatus that can implement augmented reality by projecting a virtual image onto the retina through the pupil using a reflective unit having a size smaller than that of the human pupil, as described in Related Art Document. According to this technology, the apparatus for implementing augmented reality is configured in the form of glasses and a reflective unit is disposed on the surface of a glasses lens or inside a glasses lens to reflect a virtual image generated by a display unit so that an image is formed on the retina through the pupil. Accordingly, a kind of pinhole effect is provided by deepening the depth of field, so that a clear virtual image may always be provided regardless of whether the user changes the focal length while gazing at the real world. However, this technology of the present applicant has a limitation in that the technology uses the circular point-symmetrical reflective unit, so that the difference in brightness between the central portion and the peripheral portion is relatively large, with the result that luminous uniformity is uneven.

RELATED ART DOCUMENT

Korean Patent No. 10-1660519 (published on Sep. 29, 2016)

DISCLOSURE

Technical Problem

The present invention has been conceived to overcome the above-described problems, and an object of the present invention is to provide an optical device for augmented reality that may improve luminous uniformity while deepening the depth of field and thus generating a pinhole effect by using one or more reflective units having one or more of various shapes and smaller than the pupil.

Furthermore, another object of the present invention is to provide an optical device for augmented reality that may improve luminous uniformity and widening field of view by appropriately disposing a plurality of reflective units.

Technical Solution

In order to overcome the above technical problems, the present invention provides an optical device for augmented reality, the optical device including: an optical means for transmitting at least part of visible light therethrough; and a reflective unit disposed on the surface of the optical means or inside the optical means, and configured to reflect image light corresponding to an image for augmented reality, output from an image output unit, toward the pupil of an eye of a user; wherein the reflective unit is formed in an asymmetric shape representing a shape other than a point-symmetric shape; and wherein the point-symmetric shape is a shape in which there is a specific point that allows the shape to be always the same for all rotation angles when the reflective unit is rotated around a specific point on the plane of the reflective unit, and the asymmetric shape is a shape that is not the point-symmetric shape.

In this case, it is preferable that the size of the reflective unit be 8 mm or less.

Furthermore, the size of the reflective unit may be the maximum length between any two points on the boundary line of the reflective unit.

Furthermore, the size of the reflective unit may be the maximum length between any two points on the boundary line of the orthogonal projection of the reflective unit projected onto a plane perpendicular to a forward direction from the pupil when the user gazes forward.

Furthermore, the size of the reflective unit may be the maximum length between any two points on the boundary line of the orthogonal projection of the reflective unit projected onto a plane perpendicular to a direction from the pupil to the reflective unit when the user gazes in the direction of the reflective unit.

Furthermore, the area of the reflective unit may be formed to have a value of $16\pi$ ($mm^2$) or less.

Furthermore, the area of the reflective unit may be the area of the orthogonal projection of the reflective unit projected onto a plane perpendicular to a forward direction from the pupil when the user gazes forward.

Furthermore, the area of the reflective unit may be the area of the orthogonal projection of the reflective unit projected onto a plane perpendicular to a direction from the pupil to the reflective unit when the user gazes in the direction of the reflective unit.

Furthermore, the reflective unit may include first reflective unit and second reflective unit that are disposed at a predetermined interval in a vertical direction from the center of the image output unit and alongside each other in a downstream direction; and the first and second reflective units may be disposed such that they appear partially overlapping when viewed from the center of the image output unit toward the first and second reflective units.

Furthermore, the first and second reflective units may have different shapes.

According to another aspect of the present invention, there is provided an optical device for augmented reality, the optical device including: an optical means for transmitting at least part of visible light therethrough; and a reflective unit disposed on the surface of the optical means or inside the optical means, and configured to reflect image light corresponding to an image for augmented reality, output from an image output unit, toward the pupil of an eye of a user; wherein a through hole configured to pass the image light, output from the image output unit, therethrough is formed in the center of the reflective unit.

According to still another aspect of the present invention, there is provided an optical device for augmented reality, the optical device including: an optical means for transmitting at least part of visible light therethrough; and a reflective unit disposed on the surface of the optical means or inside the optical means, and configured to reflect image light corresponding to an image for augmented reality, output from an image output unit, toward the pupil of an eye of a user; wherein the reflective unit includes first reflective unit and second reflective unit that are disposed at a predetermined interval in a vertical direction from the center of the image output unit and alongside each other in a downstream direction; and wherein the first and second reflective units are disposed such that they appear partially overlapping when viewed from the center of the image output unit toward the first and second reflective units, and a through hole configured to pass the image light, output from the image output unit, therethrough is formed in the center of the first reflective unit.

Advantageous Effects

According to the present invention, there may be provided the optical device for augmented reality that may improve luminous uniformity while deepening the depth of field and thus generating a pinhole effect by using the one or more reflective units having one or more of various shapes and smaller than the pupil.

Furthermore, the present invention provides the optical device for augmented reality that may improve luminous uniformity and widening field of view by appropriately disposing the plurality of reflective units.

BEST MODE

Embodiments of the present invention will be described in detail below with reference to the accompanying drawings.

Figure 1:
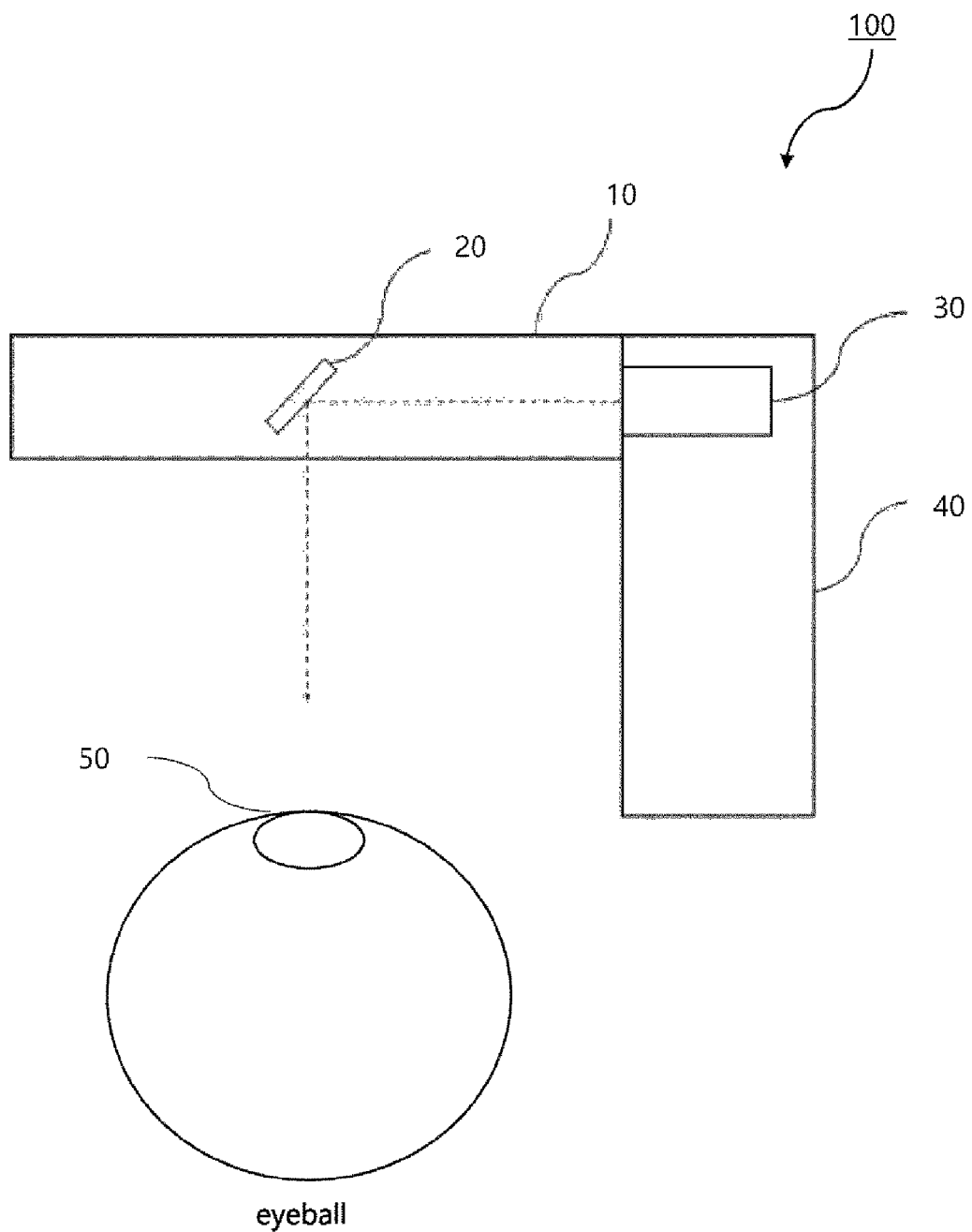
FIG. 1 is a diagram illustrating the configuration of an optical device (100) for augmented reality according to an embodiment of the present invention, which is a top view when viewed in the state in which the optical device (100) for augmented reality is placed in front of a user.

FIG. 1 is a diagram illustrating the configuration of an optical device 100 for augmented reality according to an embodiment of the present invention, which is a top view when viewed in the state in which the optical device 100 for augmented reality is placed in front of a user.

Referring to FIG. 1, the optical device 100 for augmented reality according to the present embodiment includes an optical means 10 and a reflective unit 20.

The reflective unit 20 is disposed on the surface of the optical means 10 or inside the optical means 10, and provides an image for augmented reality to a user by reflecting image light corresponding to the image for augmented reality output from the image output unit 30 toward the pupil 50 of an eye of the user. The reflective unit 20 is characterized in that it is formed in an asymmetric shape representing a shape other than a point-symmetric shape.

In FIG. 1, the image output unit 30 is a means for outputting image light corresponding to an image for augmented reality toward the reflective unit 20, and may be, e.g., a display device such as a small-sized LCD.

The display device is a means for displaying an image for augmented reality on a screen, and displays an image for augmented reality in such a manner as to emit light so that the reflective unit 20 reflects the image for augmented reality to be projected onto the pupil 50 of the user. Image light corresponding to the image for augmented reality displayed on the display device is output from the display device, and is then transferred to the reflective unit 20.

Meanwhile, the image output unit 30 may be a reflective means or a refractive means that transfers image light, output from such a display device, to the reflective unit 20 by reflecting or refracting the image light. In this case, the image light output from the display device is not directly output to the reflective unit 20, but is transferred to the reflective unit 20 through the reflective means or the refractive means.

Furthermore, the image output unit 30 may be a collimator that outputs image light, output from the display device, as collimated parallel light. Alternatively, such a collimator may be disposed in a reflective or refractive means and a display device.

In other words, the image output unit 10 refers to a display device for displaying an image for augmented reality, or various means such as a reflective or refractive means for finally transmitting image light, output from such a display device, to the reflective units 20.

In this case, the image for augmented reality refers to an image displayed on the display device, which is a virtual image provided through a pupil of a user via the reflective unit 20, and may be a still image or moving image. Such an image for augmented reality is output from the display device as image light, and is provided as a virtual image through the pupil of the user via the reflective unit 20. At the same time, the user directly receives an image of the real world through the pupil 50 via the optical means 10. Accordingly, the user may be provided with an augmented reality service.

Figure 2:
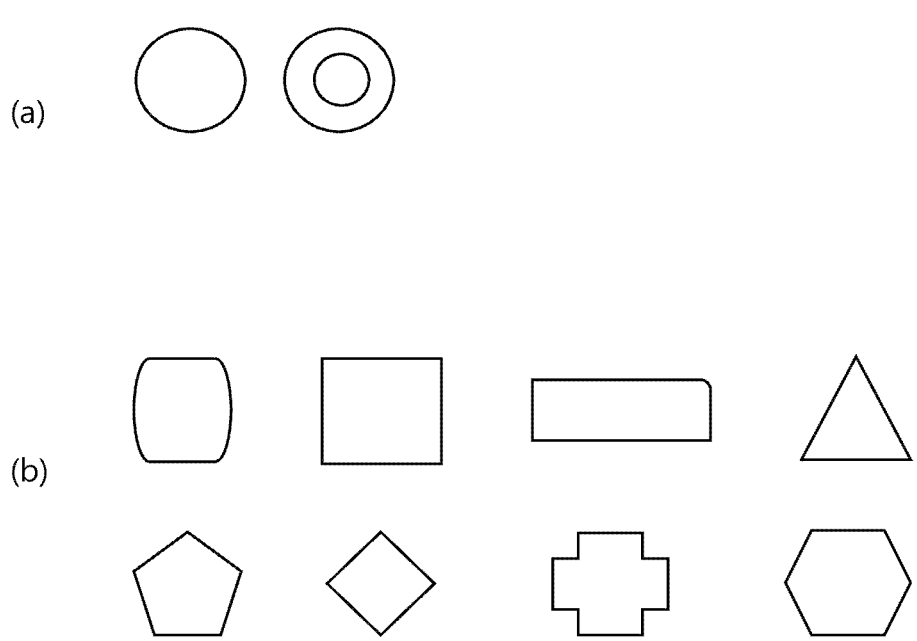
FIG. 2 illustrates plan views of reflective units (20) having a point-symmetric shape or an asymmetric shape, wherein FIG. 2(*a*) shows examples of the point-symmetric shape and FIG. 2(*b*) shows examples of the asymmetric shape.

Meanwhile, although the image output unit 30 is disposed on a right side based on a case where the user gazes forward in FIG. 2, the location of the image output unit 30 is not limited thereto, but the image output unit 30 may be disposed on an upper side, a lower side, or a diagonally upper or lower side. For example, when an apparatus for implementing augmented reality including the optical device 100 for augmented reality according to the present invention is implemented in the form of, e.g., glasses, the image output unit 30 may be disposed at an appropriate location on a glasses frame.

The display device may have only the function of receiving an image signal from an external separate image playback device and then simply displaying an image, or may be integrated with a device having a processor and memory and also having the function of storing and playing back an image.

Since the display device itself is not a direct target of the present invention and a conventionally known device capable of displaying an image on a screen may be employed, a detailed description thereof will be omitted.

The optical means 10 may be a lens for transmitting at least part of visible light therethrough, and the reflective unit 20 may be disposed in a line in the inside of or on the surface of the optical means 10.

In this case, transmitting at least part of visible light means that the transmittance of visible light is in the range of 0 to 100%. Assuming that the optical device 100 is located in a forward direction from the pupil 50 of the eye of the user, as shown in FIG. 1, the optical device 100 outputs image light to the pupil 50 by reflecting the image light corresponding to an image for augmented reality output from the image output unit 30 by means of the reflective unit 20 while allowing the user to recognize an image of the real world through the pupil 50. Accordingly, the image of the real world and the image for augmented reality are superimposed on each other and provided to the user, with the result that the user may be provided with an augmented reality service.

As shown in FIG. 1, the optical means 10 may be implemented in the form of, e.g., a rectangular lens module, and the lens module may be detachably coupled to an apparatus for implementing augmented reality in the form of glasses. Alternatively, when an apparatus for implementing augmented reality including the optical device 100 for augmented reality according to the present invention is implemented in the form of glasses, the optical means 10 may be implemented in the form of a glasses lens.

In FIG. 1, the reflective unit 20 is shown in a form embedded inside the optical means 10, but this is illustrative. The reflective unit 20 may be disposed on the the surface of the optical means 10 opposite to the pupil 50 of the user.

The frame unit 40 is a means for fixing and supporting the image output unit 30 and the optical means 10, and may be a glasses frame or the like when the optical device 100 for augmented reality is configured in the form of glasses. In the case of FIG. 1, the optical means 10 is coupled and supported at one end of the frame unit 40, and the image output unit 30 may be disposed on the frame unit 50 coupled to the optical means 10.

Next, the reflective unit 20 will be described.

The reflective unit 20 of the embodiment of FIG. 1 reflects the image light corresponding to the image for augmented reality output from the image output unit 30 toward the pupil 50 of the eye of the user, thereby performing the function of providing the image for augmented reality to the user. The reflective unit 20 is disposed on the surface of or inside the optical means 10, and is characterized in that it is formed in an asymmetric shape representing a shape other than a point-symmetric shape.

In other words, the reflective unit 20 is formed in an asymmetric shape rather than a point-symmetric shape, and reflects the image light emitted from the image output unit 30 toward the pupil 50, so that an image for augmented reality and an image of the real world are superimposed on each other and then provided, thereby providing an augmented reality service to the user.

To this end, the reflective unit 20 is disposed to have an appropriate angle between the image output unit 30 and the pupil 50. In the embodiment of FIG. 1, since the image output unit 30 is disposed on a side, the reflective unit 20 is disposed to be inclined at approximately 45 degrees with respect to a visual axis, which is a forward direction from the pupil 50, when the user gazes forward in order to reflect the image light output from the image output unit 30 toward the pupil 50 of the user. If the image output unit 30 is disposed elsewhere in the frame unit 50, the reflective unit 20 will be disposed to have an appropriate angle at which it can reflect the image light from a corresponding location in the direction of the pupil 50.

In this case, the point-symmetric shape is defined as a shape in which there is a specific point that allows the shape to be always the same for all rotation angles when the reflective unit 20 is rotated around a specific point on the plane of the reflective unit 20. The asymmetric shape is defined as a shape that is not a point-symmetric shape, i.e., a shape in which there is no specific point that allows the shape to be always the same for all rotation angles when the reflective unit 20 is rotated around the specific point on the plane of the reflective unit 20.

For example, a circle is a point-symmetric shape because it always has the same shape for all rotation angles when it is rotated based on the center point of the circle. In addition, a circular shape in which a hole is formed, such as a donut shape, is also a point-symmetric shape.

Meanwhile, an equilateral triangle may not always be viewed as the same shape for all angles because the equilateral triangle becomes the same as the original shape when it is rotated by 120 degrees, 240 degrees, or 360 degrees based on the center thereof but is not the same shape as the original shape at angles other than the above angles. Accordingly, in the present invention, the equilateral triangle is classified as an asymmetric shape other than a point-symmetric shape.

Furthermore, a square is also classified as an asymmetric shape other than a point-symmetric shape in the present invention because it becomes the same as the original shape each time it is rotated by 90 degrees from the center point thereof but is not the same shape as the original shape at other angles.

FIG. 2 illustrates plan views of reflective units 20 having a point-symmetric shape or an asymmetric shape, wherein FIG. 2(a) shows examples of the point-symmetric shape and FIG. 2(b) shows examples of the asymmetric shape.

Examples of the point-symmetric shape include a circle and a donut shape, as shown in FIG. 2(a), and examples of the asymmetric shape include a triangle, a square, an oval, a pentagon, a hexagon, and other irregular shapes, as shown in FIG. 2(b).

The shapes of the reflective units 20 shown in FIG. 2 are illustrative, and shapes other than these shapes may be applied to the present invention.

Next, optical characteristics according to the shape of the reflective unit 20 will be described.

Figure 3:
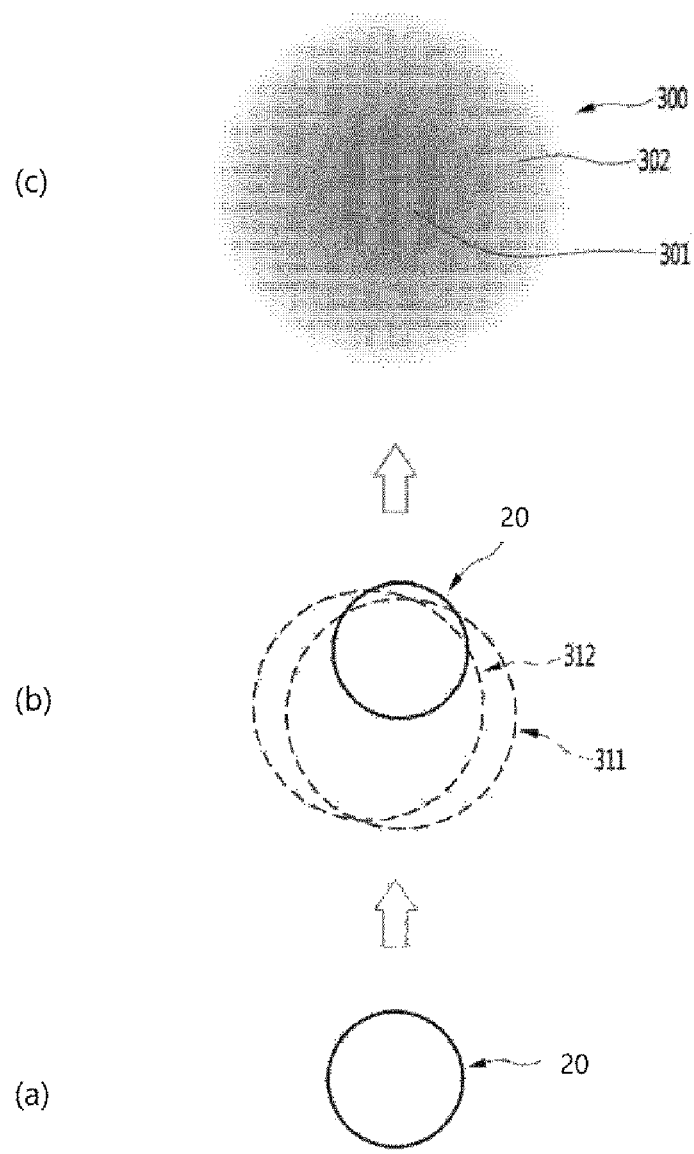
FIG. 3 is a diagram illustrating optical characteristics when a reflective unit (20) is formed in the shape of a circle, which is a point-symmetrical shape.

FIG. 3 is a diagram illustrating optical characteristics when the reflective unit 20 is formed in the form of a circle, which is a point-symmetrical shape.

First, when the circular reflective unit 20 shown in FIG. 3(a) is divided into unit mirrors of a fine size, the amounts 311 and 312 of light reflected from the respective unit mirrors are obtained, as shown in FIG. 3(b), and the amounts of light reflected from the respective unit mirrors are superimposed on each other, the brightness distribution 300 shown in FIG. 3(c) may be obtained.

The brightness distribution 300 shown in FIG. 3(c) represents the actual amount of light reaching the pupil 30 of the user when the image light output from the image output unit 30 is reflected by the circular reflective unit 20. It can be seen that a bright area is formed in the central portion 301 marked with a dark color, an area darker than the central portion 301 is formed in the peripheral portion 302 marked with a relatively light color, and there is a relatively large difference in the amount of light between the central portion 301 and the outer edges of the peripheral portion 302. In FIG. 3(c), the darker the color is, the brighter the area is (the larger the amount of light is), and the lighter the color is, the darker the area is (the smaller the amount of light is).

This means that in the circular reflective unit 20, the brightness of the central portion 301 is significantly desirable, but the peripheral portion 302 appears darker than the central portion 301 and the difference in brightness is relatively large. In other words, it means that luminous uniformity is uneven.

Figure 4:
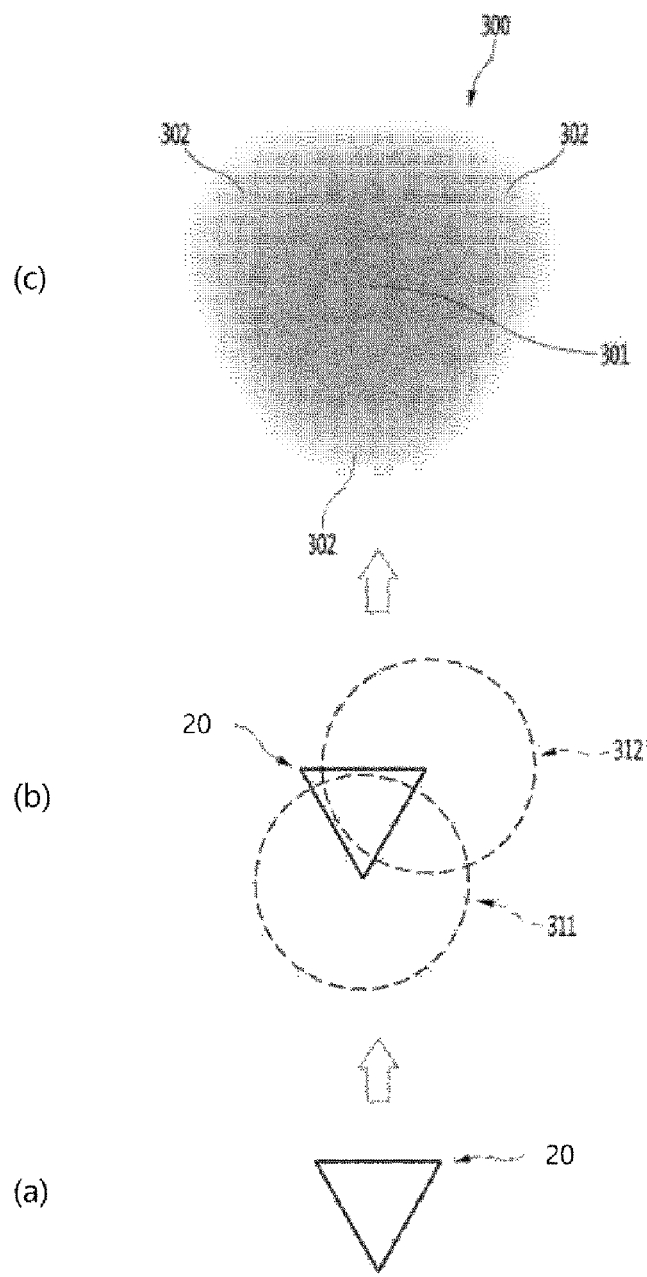
FIG. 4 is a diagram illustrating optical characteristics when a reflective unit (20) is formed in the shape of a triangle, which is an asymmetrical shape.

FIG. 4 is a diagram illustrating optical characteristics when the reflective unit 20 is formed in the shape of a triangle, which is an asymmetrical shape.

As in FIG. 3, when the triangular reflective unit 20 shown in FIG. 4(a) is divided into unit mirrors of a fine size, the amounts 311 and 312 of light reflected from the respective unit mirrors are obtained, as shown in FIG. 4(b), and the amounts of light reflected from the respective unit mirrors are superimposed on each other, the brightness distribution 300 shown in FIG. 4(c) may be obtained.

It can also be seen that in the brightness distribution 300 shown in FIG. 4(c), although a bright area is formed in a central portion 301 and an area darker than the central portion 301 is formed in a peripheral portion 302, the difference in the amount of light between the central portion 301 and the outer edges of the peripheral portion 302 is smaller than that in the circular reflective unit 20 of FIG. 3.

This means that in the triangular reflective unit 20, the brightness of the central portion 301 may be slightly lower than the brightness of the central portion of the circular reflective unit 20, but the degree to which the peripheral portion 302 appears darker than the central portion 301 is less than that in the case of the circular reflective unit 20. Accordingly, the case of a triangle shown in FIG. 4, i.e., the case of an asymmetrical shape, has an advantage in that the difference in brightness between the central portion 301 and the peripheral portion 302 is not larger than that in the point-symmetric shape, and thus a relatively even brightness distribution may be obtained over the overall area of the reflective unit 20.

Figure 5:
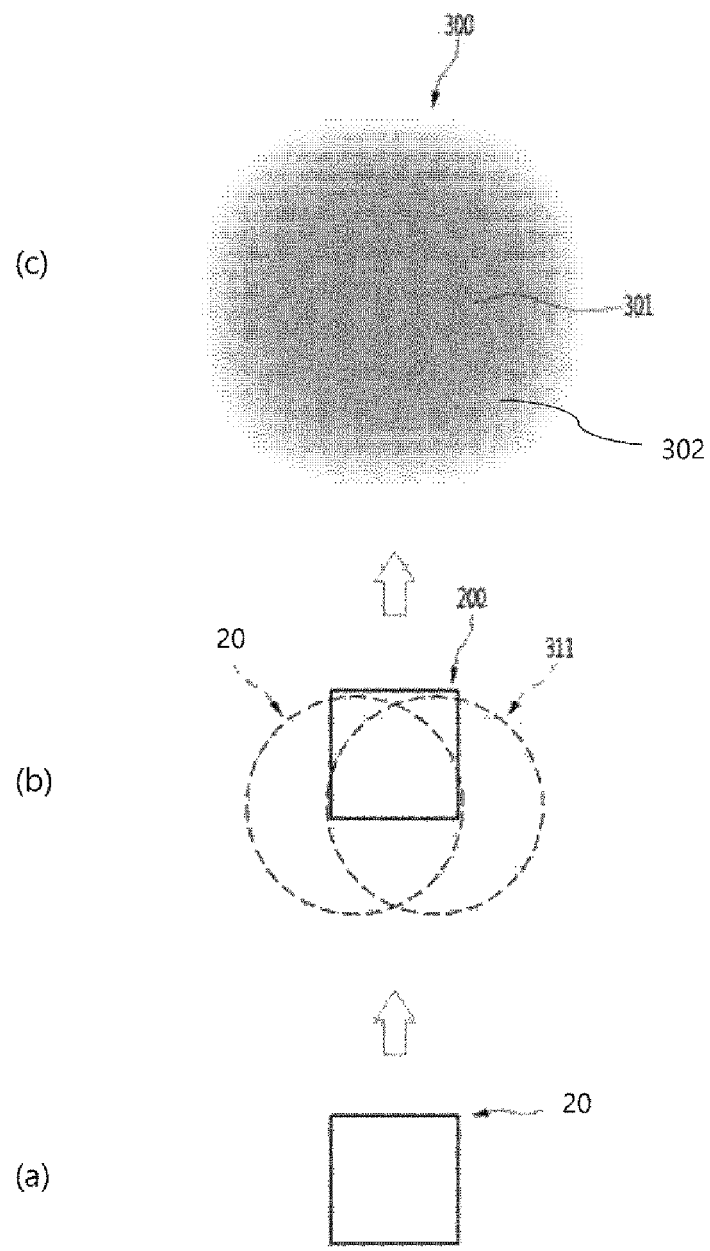
FIG. 5 is a diagram illustrating optical characteristics when a reflective unit (20) is formed in the shape of a rectangle, which is an asymmetrical shape.

FIG. 5 is a diagram illustrating optical characteristics when the reflective unit 20 is formed in the shape of a rectangle, which is an asymmetrical shape.

As in FIGS. 3 and 4, when the rectangular reflective unit 20 shown in FIG. 5(a) is divided into unit mirrors of a fine size, the amounts 311 and 312 of light reflected from the respective unit mirrors are obtained, as shown in FIG. 5(b), and the amounts of light reflected from the respective unit mirrors are superimposed on each other, the brightness distribution 300 shown in FIG. 5(c) may be obtained.

It can also be seen that in the brightness distribution 300 shown in FIG. 5(c), although a bright area is formed in a central portion 301 and an area darker than the central portion 301 is formed in a peripheral portion 302, the difference in the amount of light between the central portion 301 and the outer edges of the peripheral portion 302 is smaller than that in the circular reflective unit 20 of FIG. 3, and the difference in brightness between the central portion 301 and the peripheral portion 302 is not larger than that in the point-symmetric shape, as in the case of the triangular reflective unit 20 of FIG. 4. As a result, a relatively even brightness distribution may be obtained over the overall area of the reflective portion 20.

Therefore, as described with reference to FIGS. 1 to 5, it can be seen that when the asymmetrical reflective unit 20 other than a point-symmetrical reflective unit is used, there is achieved the effect of providing a virtual image having a small difference in brightness between the central portion and the peripheral portion to the user because an even brightness distribution may be obtained over the overall area of the reflective unit 20 compared to the point-symmetrical reflective unit 20. In other words, there may be provided a virtual image in which luminous uniformity is evenly distributed.

Meanwhile, in the present invention, it is preferable that the size of the reflective unit 20 be smaller than the size of the human pupil. In general, it is known that the size (diameter) of the human pupil ranges from 2 to 8 mm on average. Accordingly, in the present invention, the reflective unit 20 is formed to have a size of 8 mm or less.

When the reflective unit 20 is formed to have a size smaller than that of the pupil as described above, the depth of field for light entering the pupil through the reflective unit 20 may be made significantly deep. In this case, the depth of field refers to a range within which an image for augmented reality is recognized as being in focus. When the depth of field deepens, this means that a focal length for an image for augmented reality increases. Accordingly, even when a user changes the focal length for the real world while gazing at the real world, an image for augmented reality is always recognized as being in focus regardless of such a change. This may be viewed as a kind of pinhole effect.

Since the basic configuration for making the reflective unit 20 smaller than the size of the pupil and the effect thereof are disclosed in detail in [Related Art Document], detailed descriptions thereof will be omitted.

In this case, the size of the reflective unit 20 is defined to mean the maximum length between any two points on the boundary line of the reflective unit 20.

Meanwhile, as shown in FIG. 1, in the case where the reflective unit 20 is located in front of the pupil 50 of the user, the size of the reflective unit 20 may be the maximum length between any two points on the boundary of the orthogonal projection of the reflective unit 20 projected onto a plane perpendicular to a forward direction from the pupil 50 when the user gazes forward.

Furthermore, the reflective unit 20 may be disposed on a side or in a vertical direction, not in the forward direction from the pupil 50 of the user. In this case, the size of the reflective unit 20 may be the maximum length between any two points on the boundary line of the orthogonal projection of the reflective unit 20 projected onto a plane perpendicular to a direction from the pupil 50 to the reflective unit 20 when the user gazes in the direction of the reflective unit 20.

Meanwhile, in the present invention, it is preferable that the area of the reflective unit 20 may be formed to be smaller than that of the human pupil 30. For example, when the pupils of people are considered to have a circular shape, the diameters of the pupils range from 2 to 8 mm and the radii thereof range from 1 to 4 mm. Accordingly, the areas of the pupils have a maximum of $16\pi$ (mm$^2$) according to the equation "$\pi r^2$," and thus the area of the reflective unit 20 is preferably formed to have a value of $16\pi$ (mm$^2$) or less.

Meanwhile, as shown in FIG. 1, in the case where the reflective unit 20 is located in front of the pupil 50 of the user, the area of the reflective unit 20 may be the area of an orthogonal projection obtained by projecting the reflective unit 20 onto a plane perpendicular to a forward direction from the pupil 50 when the user gazes forward.

Furthermore, the reflective unit 20 may be disposed on a side or in a vertical direction, not in the forward direction from the pupil 50 of the user. In this case, the area of the reflective unit 20 may be the area of the orthogonal projection of the reflective unit 20 projected onto a plane perpendicular to a direction from the pupil 50 to the reflective unit 20 when the user gazes in the direction of the reflective unit 20.

Figure 6:
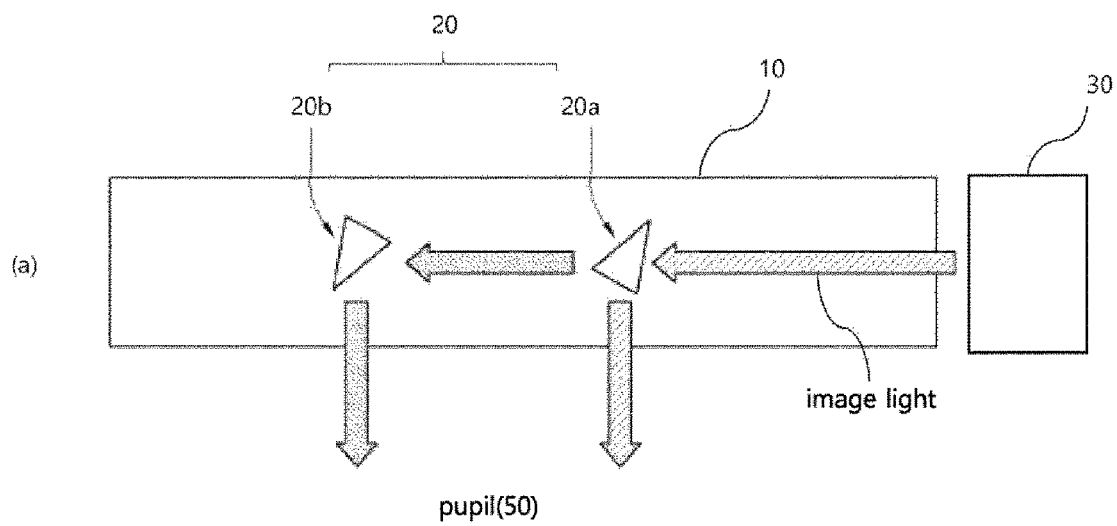
FIG. 6 shows views illustrating reflective units (20) according to another embodiment of the present invention.
Figure 6:

FIG. 6 shows views illustrating reflective units 20 according to another embodiment of the present invention, wherein FIG. 6(a) is a top view showing an optical device 100 for augmented reality based on a case where a user gazes at the real world and FIG. 6(b) is a view showing the shapes of the reflective units 20 when viewed from an image output unit 30.

Referring to FIG. 6, the reflective units 20 include a first reflective unit 20a and a second reflective unit 20b, and the first and second reflective units 20a and 20b are disposed at a predetermined interval in a vertical direction from the center of the image output unit 30 and alongside each other in a downstream direction. In other words, the first and second reflective units 20a and 20b are disposed on the same line as the image light of an image for augmented reality that is output in the vertical direction from the center of the image output unit 30.

Furthermore, the first and second reflective units 20a and 20b are disposed such that they appear partially overlapping, as shown in FIG. 6(b), when viewed from the center of the image output unit 30 toward the first and second reflective units 20a and 20b. In other words, the first and second reflective units 20a and 20b are disposed such that they do not appear completely overlapping when viewed from the center of the image output unit 30 toward the first and second reflective units 20a and 20b.

In FIG. 6, both the first and second reflective units 20a and 20b have a triangular shape and are in a 180-degree rotation relationship with each other.

When the first and second reflective units 20a and 20b are disposed in this manner, the image light reflected from the first and second reflective units 20a and 20b and incident on the pupil 50 of the user may appear, as shown in FIG. 6(b).

In FIG. 6(b), the black portion is a region where the first and second reflective units 20a and 20b overlap each other, and is a region where image light is not transferred to the second reflective unit 20b. The second reflective unit 20b may not reflect image light corresponding to the overlapping region to the pupil 50, but the image light corresponding to this region may be transferred to the pupil 50 by the first reflective unit 20a. Accordingly, as a whole, a star-shaped image for augmented reality shown in FIG. 6(b) may be projected onto the pupil 50 of the user.

Figure 7:
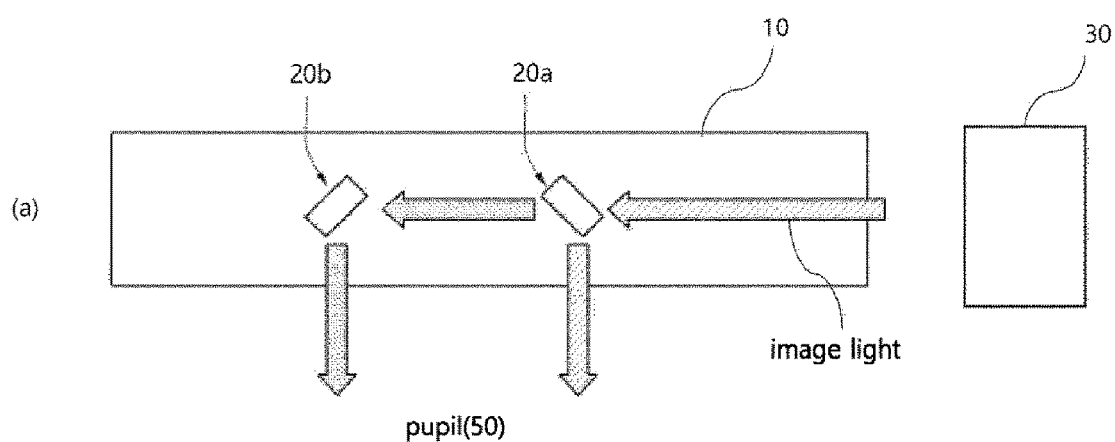
FIG. 7 shows views illustrating reflective units (20) according to another embodiment of the present invention.
Figure 7:
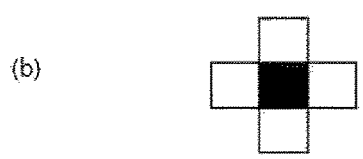

FIG. 7 shows views illustrating reflective units 20 according to another embodiment of the present invention, wherein FIG. 7(a) is a top view showing an optical device 100 for augmented reality based on a case where a user gazes at the real world and FIG. 7(b) is a view showing the shapes of the reflective units 20 when viewed from an image output unit 30 toward the reflective units 20.

The embodiment of FIG. 7 also has the same basic configuration as the embodiment of FIG. 6, but differs from the embodiment of FIG. 6 in that the shapes of first and second reflective units 20a and 20b are rectangular shapes disposed in lateral and vertical directions.

In the case of FIG. 7 as well, the image light reflected from the first and second reflective units 20a and 20b and incident on the pupil 50 of the user may appear, as shown in FIG. 7(b). In FIG. 7(b), the black portion indicates a region where the first and second reflective units 20a and 20b overlap each other and thus image light is not transferred to the second reflective unit 20b. The second reflective unit 20b may not reflect image light corresponding to the overlapping region to the pupil 50, but the image light corresponding to this region may be transferred to the pupil 50 by the first reflective unit 20a. Accordingly, as a whole, a cross-shaped image for augmented reality shown in FIG. 7(b) may be projected onto the pupil 50 of the user.

In the embodiments of FIGS. 6 and 7, the first and second reflective units 20a and 20b are in a relationship in which they have the same shape when rotated by a predetermined angle with respect to each other, but the relationship is not limited thereto. The first and second reflective units 20a and 20b may have different shapes as long as the first and second reflective units 20a and 20b at least partially overlap each other when viewed from the image output unit 30 toward the first and second reflective units 20a and 20b. In other words, the first and second reflective units 20a and 20b may be in a relationship in which they do not have the same shape even when either of them is rotated. For example, the first reflective unit 20a may be formed in a triangular shape, and the second reflective unit 20b may be formed in a rectangular shape.

Furthermore, it will be apparent that although the reflective units 20 have been described as including the two reflective units in the embodiments of FIGS. 6 and 7, the reflective units 20 may include three or more reflective units 20 as long as they do not completely overlap one another.

According to the configurations of the embodiments of FIGS. 6 and 7, the reflective units 20 may be extended and disposed in a direction from the image output unit 30 toward the reflective units 20, so that an advantage arises in that the field of view may be widened to that extent.

Meanwhile, in the embodiments of FIGS. 6 and 7, it is preferable that the distance between the first and second reflective units 20a and 20b be 8 mm or less, which is smaller than the size of the pupil 50 of the eye of the user.

Figure 8:
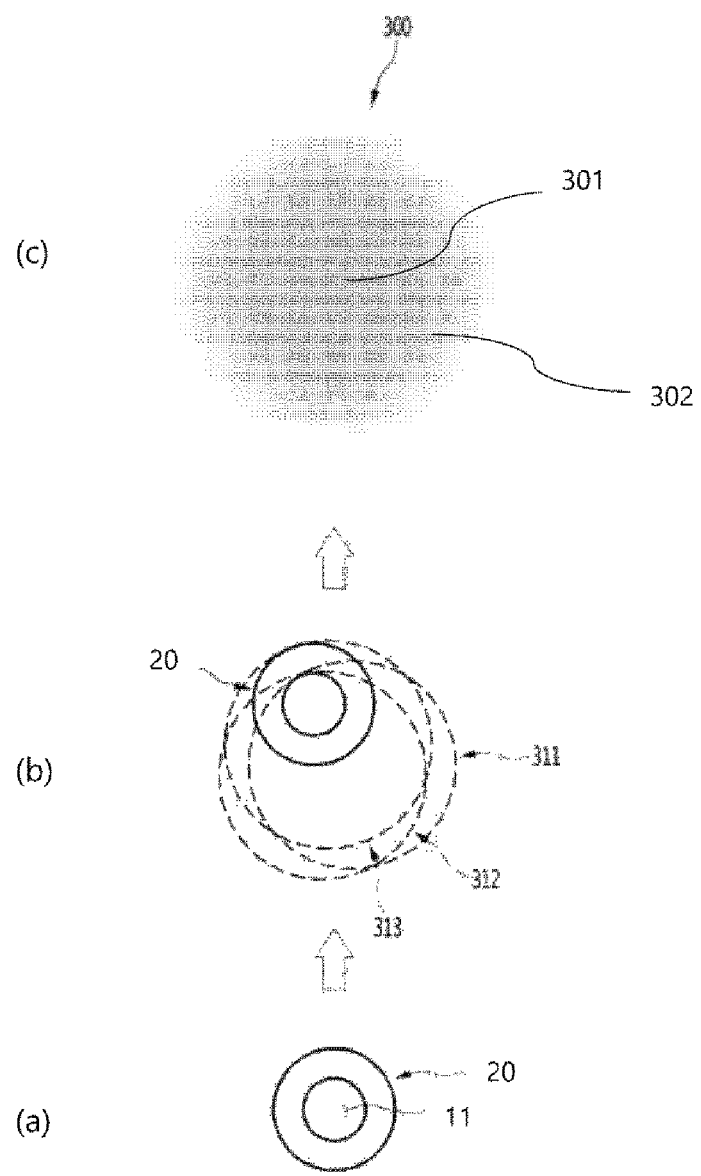
FIG. 8 is a view illustrating a reflective unit (20) according to still another embodiment of the present invention.

FIG. 8 is a view illustrating a reflective unit 20 according to still another embodiment of the present invention.

Referring to FIG. 8, the reflective unit 20 is characterized in that a through hole 11 is formed in the center of the reflective unit 20, as shown in FIG. 8(a), and thus the reflective unit 20 passes the image light output from the image output unit 30 therethrough without reflecting the image light.

As described in FIGS. 3 to 5, when the donut-shaped circular reflective unit 20 shown in FIG. 8(a) is divided into unit mirrors of a fine size, the amounts 311 and 312 of light reflected from the respective unit mirrors are obtained, as shown in FIG. 8(b), and the amounts of light reflected from the respective unit mirrors are superimposed on each other, the brightness distribution 300 shown in FIG. 8(c) may be obtained.

Referring to the brightness distribution 300 shown in FIG. 8(c), it can be seen that the difference in brightness between a central portion 301 and a peripheral portion 302 is significantly small. The reason for this is that the through hole 11 formed in the center does not reflect the image light output from the image output unit 30.

Therefore, it can be seen that the donut-shaped circular reflective unit 20 of FIG. 8 has a small difference in brightness between the central portion 301 and the peripheral portion 302, so that a relatively even brightness distribution may be obtained over the overall area of the reflective unit 20.

In FIG. 8, the donut-shaped circular reflective unit 20 has been described as an example, but the present invention is not limited thereto. As long as the through hole 11 that does not reflect image light from the display unit 20 is formed in the central region, the asymmetrical reflective units 20 described in FIGS. 1 to 5 may be employed.

Figure 9:
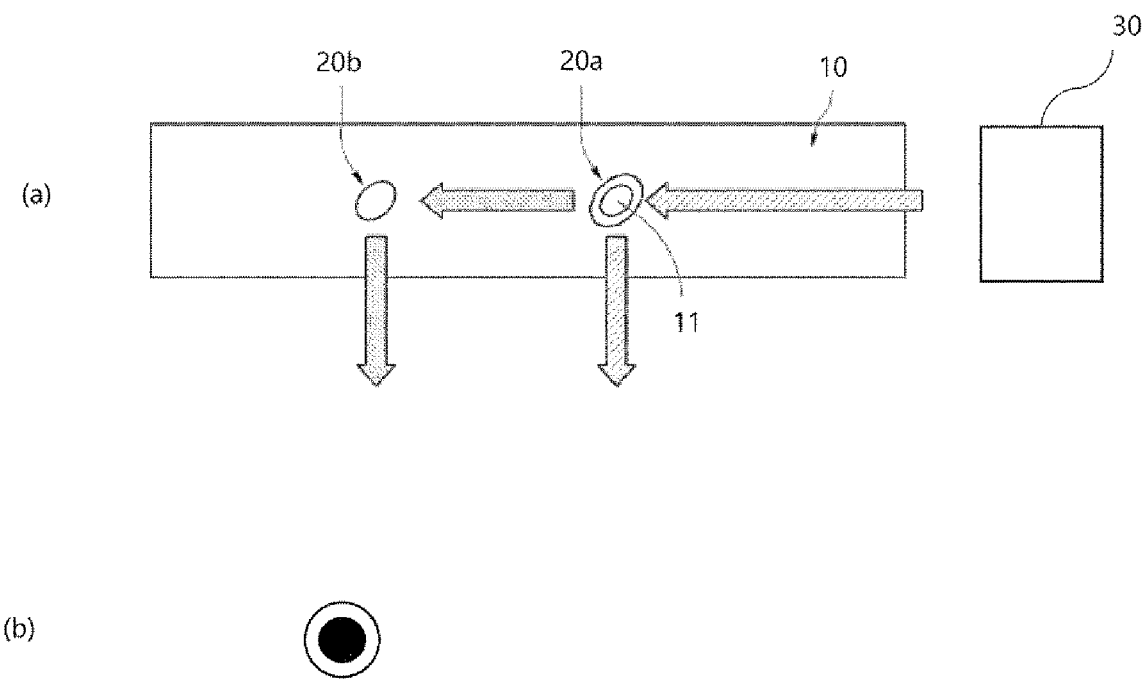
FIG. 9 shows views illustrating reflective units (20) according to another embodiment of the present invention.

FIG. 9 shows views illustrating reflective units 20 according to another embodiment of the present invention, wherein FIG. 9(a) is a top view showing an optical device 100 for augmented reality based on a case where a user gazes at the real world and FIG. 9(b) is a view showing the shapes of the reflective units 20 when viewed from an image output unit 30 toward the reflective units 20.

The embodiment of FIG. 9 is similar to the embodiments of FIGS. 6 and 7, but differs from the embodiments of FIGS. 6 and 7 in that a through hole 11 is formed in a central portion of a first reflective unit 20a and a second reflective unit 20b, as shown in FIG. 8. In other words, in the embodiment of FIG. 9, the first and second reflective units 20a and 20b are disposed such that they appear as a donut shape, as shown in FIG. 9(b), when viewed from the image output unit 30 toward the reflective units 20.

When the first and second reflective units 20a and 20b are disposed in this manner, the image light reflected by the first and second reflecting units 20a and 20b and incident on the pupil 50 of the user appears, as shown in FIG. 9(b). In FIG. 9(b), the black portion is a region where the image light from the image output unit 30 is directly transferred to the second reflective unit 20b by the through hole 11 of the first reflective unit 20a. The image light corresponding to the outer edge region of the first reflective unit 20a may not be directly transferred to the second reflective unit 20b by the outer edge region of the first reflective unit 20a, but the image light corresponding to this region may be transferred to the pupil 50 by the first reflective unit 20a. Therefore, as a whole, an image for augmented reality shown in FIG. 9(b) may be projected onto the pupil 50 of the user.

While the present invention has been described above with reference to the preferred embodiments according to the present invention, it will be apparent that the present invention is not limited to the above embodiments but various modifications or alterations may be possible.

The invention claimed is:

1. An optical device for augmented reality, the optical device comprising:
an optical means for transmitting at least part of visible light therethrough; and
a reflective unit disposed on a surface of the optical means or inside the optical means, and configured to reflect image light corresponding to an image for augmented reality, output from an image output unit, toward a pupil of an eye of a user;
wherein the reflective unit is formed in an asymmetric shape representing a shape other than a point-symmetric shape; and
wherein the point-symmetric shape is a shape in which there is a specific point on a plane of the reflective unit that allows the shape to be always a same shape for all rotation angles when the reflective unit is rotated around the specific point on a plane of the reflective unit, and the asymmetric shape is a shape that is not the point-symmetric shape;
wherein:
the reflective unit comprises a first reflective unit and a second reflective unit that are disposed at a predetermined interval in a vertical direction from a center of the image output unit and alongside each other in a downstream direction; and
the first reflective unit and second reflective unit are disposed such that the first reflective unit and second reflective unit appear partially overlapping when viewed from the center of the image output unit toward the first reflective unit and second reflective unit.

2. The optical device of claim 1, wherein a size of the reflective unit is 8 mm or less.

3. The optical device of claim 2, wherein the size of the reflective unit is a maximum length between any two points on a boundary line of the reflective unit.

4. The optical device of claim 2, wherein the size of the reflective unit is a maximum length between any two points on a boundary line of an orthogonal projection of the reflective unit projected onto a plane perpendicular to a forward direction from the pupil when the user gazes forward.

5. The optical device of claim 2, wherein the size of the reflective unit is a maximum length between any two points on a boundary line of an orthogonal projection of the reflective unit projected onto a plane perpendicular to a direction from the pupil to the reflective unit when the user gazes in a direction of the reflective unit.

6. The optical device of claim 1, wherein an area of the reflective unit is formed to have a value of $16\pi$ (mm$^2$) or less.

7. The optical device of claim 6, wherein the area of the reflective unit is an area of an orthogonal projection of the reflective unit projected onto a plane perpendicular to a forward direction from the pupil when the user gazes forward.

8. The optical device of claim 6, wherein the area of the reflective unit is an area of an orthogonal projection of the reflective unit projected onto a plane perpendicular to a direction from the pupil to the reflective unit when the user gazes in a direction of the reflective unit.

9. The optical device of claim 1, wherein the first and second reflective units have different shapes.

10. An optical device for augmented reality, the optical device comprising:
- an optical means for transmitting at least part of visible light therethrough; and
- a reflective unit disposed on a surface of the optical means or inside the optical means, and configured to reflect image light corresponding to an image for augmented reality, output from an image output unit, toward a pupil of an eye of a user;
- wherein a through hole configured to pass the image light, output from the image output unit, is formed in a center of the reflective unit; and
- wherein:
- the reflective unit comprises a first reflective unit and a second reflective unit that are disposed at a predetermined interval in a vertical direction from a center of the image output unit and alongside each other in a downstream direction; and
- the first reflective unit and second reflective unit are disposed such that the first reflective unit and second reflective unit appear partially overlapping when viewed from the center of the image output unit toward the first reflective unit and second reflective unit.

11. An optical device for augmented reality, the optical device comprising:
- an optical means for transmitting at least part of visible light therethrough; and
- a reflective unit disposed on a surface of the optical means or inside the optical means, and configured to reflect image light corresponding to an image for augmented reality, output from an image output unit, toward a pupil of an eye of a user;
- wherein the reflective unit comprises first reflective unit and second reflective unit that are disposed at a predetermined interval in a vertical direction from a center of the image output unit and alongside each other in a downstream direction; and
- wherein the first and second reflective units are disposed such that they appear partially overlapping when viewed from the center of the image output unit toward the first and second reflective units, and a through hole configured to pass the image light, output from the image output unit, therethrough is formed in a center of the first reflective unit.

* * * * *